United States Patent

[11] 3,616,253

| [72] | Inventor | Anthony J. D'Eustachio<br>Wilmington, Del. |
|---|---|---|
| [21] | Appl. No. | 635,109 |
| [22] | Filed | May 1, 1967 |
| [45] | Patented | Oct. 26, 1971 |
| [73] | Assignee | E. I. du Pont de Nemours and Company<br>Wilmington, Del. |

[54] METHOD FOR DETERMINING BACTERIAL POPULATIONS
9 Claims, 1 Drawing Fig.

| [52] | U.S. Cl. | 195/103.5 |
|---|---|---|
| [51] | Int. Cl. | C12k 1/00 |
| [50] | Field of Search | 195/103.5 |

[56] References Cited
OTHER REFERENCES

Rose, A. H. " Chemical Microbiology" 1965 pp. 194– 5
Schaechter et al. " J. Gen. Micro." 19: 592– 606 1958.
Framsen, J. S. & Binkley, S. B. " Comparison of the Acid-Soluble Nucleotides in Escherichia Coli at different Growth Rates." Journal Biological Chem. Feb. 1961 236: 515– 518
Colowick et al., Methods In Enzymology Vol. III pp. 871– 873 (1957)

*Primary Examiner*—A. Louis Monacell
*Assistant Examiner*—Max D. Hensley
*Attorney*—Herbert M. Wolfson ABSTRACT: A method for determining the population density of bacterial cells in an environment comprising, 1. separating substantially all nonbacterial cells from an aqueous sample of the environment, for example, by low force centrifugation, 2. separating substantially all bacterial cells from the sample, e.g., by filtration, 3. extracting adenosine triphosphate (hereinafter referred to as ATP) from the bacterial cells, 4. measuring the quantity of ATP present, such as, by reacting the ATP with luciferin and luciferase and measuring the light emitted, and 5. determining the number of bacterial cells in the sample, preferably, by dividing the quantity of ATP, in micrograms, by the average ATP/per cell which was found to be about $5 \times 10^{110}$ micrograms.

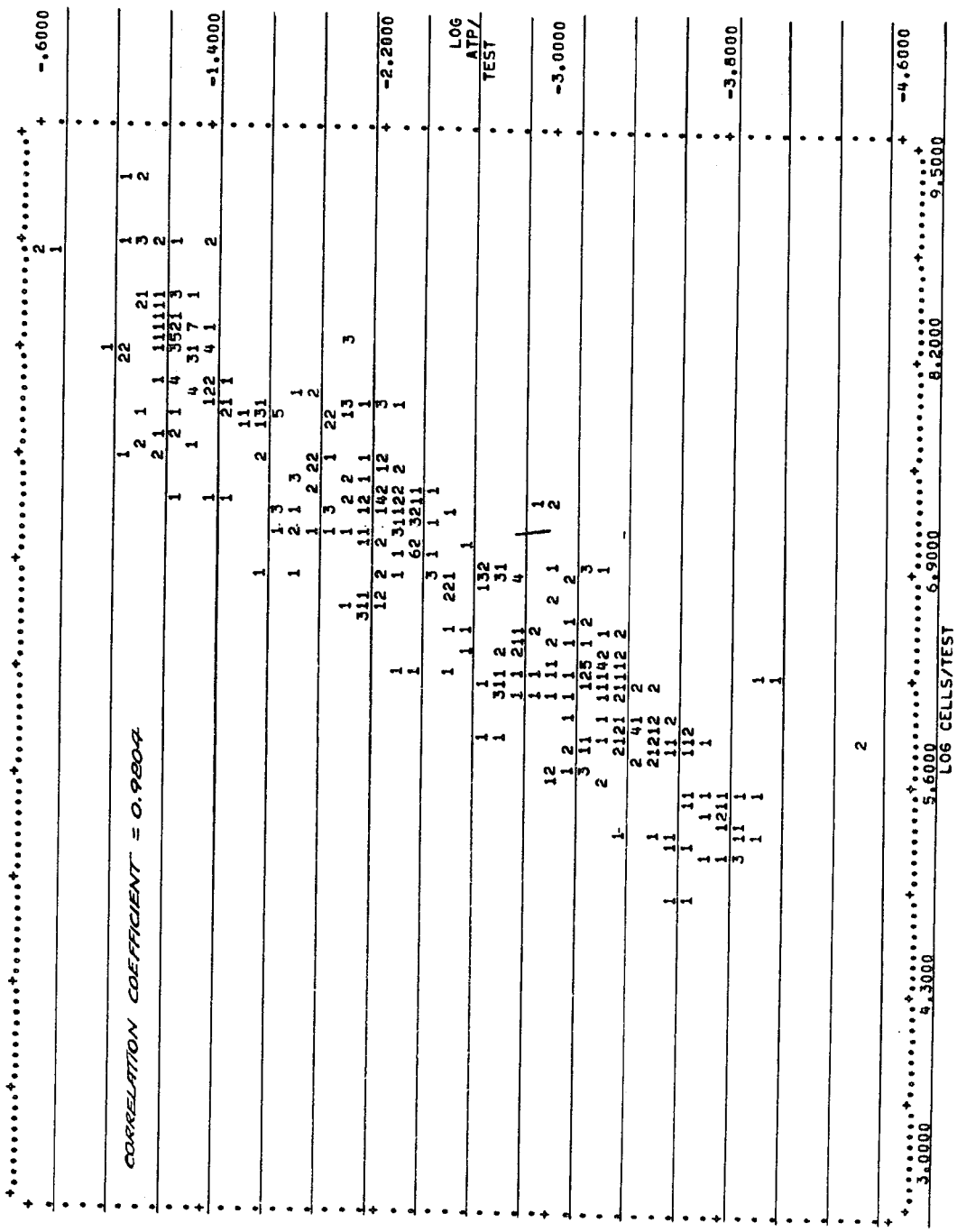

3,616,253

METHOD FOR DETERMINING BACTERIAL POPULATIONS

CROSS REFERENCES TO RELATED APPLICATIONS

A detailed description of methods and apparatus for detecting the presence of life based on the ubiquity of ATP in living organisms may be found in U.S. application Ser. No. 433,488, now abandoned, filed Feb. 19, 1965, entitled Method of Detecting Living Organisms, and U.S. application Ser. No. 434,240, now U.S. Pat. No. 3,359,973, filed Feb. 19, 1965, entitled Bioluminescence Reaction Chamber. Additionally, U.S. application Ser. No. 550,103, now U.S. Pat. No. 3,432,487, filed May 16,1966, entitled Process for Extraction and Concentration of Hydrophilic Substances, discloses a method for extracting ATP from cellular organisms. These cross-references are merely exemplary and are not intended to restrict the scope of the present invention as set forth in the appended claims.

BACKGROUND OF THE INVENTION

ATP is present in all living organisms. Therefore, by analyzing a sample of an environment for ATP, it is possible to detect the presumptive presence of living organisms in that environment. This analysis is particularly useful for determining the presence of bacteria in various environments. Often, however, a quantitative, rather than a qualitative, determination is required. Quantitative analysis for bacteria is desirable, for example, in the determination of background levels of bacteria in environments, such as, air, fuels, water, milk, food, medical supplies, pharmaceuticals, clean assembly areas, hospital rooms and germ-free areas, and the detection of increased contamination in these environments; in the detection of infections, e.g., kidney infections by urine analysis; in biomedical studies of bacteria cultures; and in monitoring the effectiveness of pollution controls and sterilization procedures and the sterilization of compounds and apparatus. One way to obtain a quantitative determination is by counting colonies of bacterial cells an agar plate cultures. However, this method is tedious, requiring considerable time and effort. Furthermore, accuracy is limited by cell clumping.

SUMMARY OF THE INVENTION

The instant invention provides a substantially rapid and accurate method for determining the quantitative existence of bacteria in a given environment. This method comprises the following steps:

1. separating substantially all nonbacterial cells from an aqueous suspension of a sample of an environment,
2. separating substantially all bacterial cells from said suspension,
3. extracting ATP from said bacterial cells, and
4. measuring the quantity of adenosine triphosphate extracted whereby the population density of bacterial cells in said environment is determined.

For a detailed understanding of the invention, reference is made to the following description of various embodiments thereof and to the attendant drawing which is a computer printout of data obtained in accordance with one embodiment of the invention.

Biological material containing bacterial cells may be obtained, inter alia, from animal tissues, suspensions of micro-organisms, blood, urine, water or beverages suspected of contamination, patient exudates, air or fuel suspected of containing micro-organisms, and food or other contaminated environments. The procuring of a sample of an environment and its subsequent storage prior to assay for ATP may be carried out by any appropriate method known in the art. The size of the sample is controlled by the sensitivity and range of the means used to measure the quantity of ATP present in the sample. The sample, if not already in aqueous form, may be suspended in sterile water, buffer or saline solution. It is then treated to remove substantially all nonbacterial cells, e.g., living organisms, leucocytes, etc. This may be performed by centrifugation at a force sufficient to result in a centrifugate having a lower layer substantially free from bacterial cells and an upper layer (supernatant) substantially free from nonbacterial cells. This is preferably carried out at a force from about 150x $g$ to about 250x $g$.

After this separation, the supernatant (if the prior step was performed by centrifugation) containing bacterial cells is subjected to a further separation step wherein the bacterial cells are isolated from substantially all extracellular water-soluble material. The cells are preferably isolated by passing the supernatant through a microporous membrane and subsequently washing, e.g., with sterile cold saline solution.

Applicant has found that the aforementioned extracellular water-soluble material, including, for example, contaminating salts, acids and nonbacterial ATP, interferes with the accuracy of the subsequent ATP assay. In particular, the presence of soluble nonbacterial ATP leads to high, irregular values for intracellular ATP.

The indicated order of the previous two steps is desirable. Applicant has found that effecting separation of water-soluble material prior to the removal of nonbacterial cells may result in high values for intercellular ATP. Apparently this is a result of the presence of residual nonbacterial ATP in the assayed sample.

Qualitative results may be obtained by assaying directly the intact bacterial cells. However, for accurate quantitative assays, it is desirable to extract ATP from the cells. Typical methods for carrying out this extraction include the use of hot water, acetone, dimethylsulfoxide, perchloric acid, butanol, ethyl alcohol, etc., and ultrasonic disruption of the cells. This extraction is preferably accomplished by immersing the cells in a buffered aqueous solution of n-butanol as described in application Ser. No. 550,103. The relative amounts of n-butanol, and buffer solution are important. Sufficient n-butanol is used to bring about the release of ATP and sufficient buffer solution is used to provide the desired volume of aqueous phase which carries the ATP released from the cells.

An aqueous extract of ATP may then be assayed by means of the firefly bioluminescent technique disclosed in application Ser. No. 433,488, by contacting an aliquot of the extract in the presence of oxygen with a reaction mixture which contains luciferin, luciferase and a magnesium salt, and monitoring for the emission of light. The aqueous reaction medium (reaction mixture+extract) will generally contain enough oxygen to allow the reaction to take place. The quantity or maximum intensity of light emitted is a measure of the intracellular ATP present. By application of the single correlation shown in the accompanying drawing (later discussed), the population density of the bacterial cells may be determined.

The reaction mixture may be prepared using firefly lantern extract or the individual constituents which participate in the bioluminescent reaction. Commercial lyophilized firefly lantern extract is preferably dissolved in a sterile aqueous solution (pH 7.4) having $MgSO_4$ and potassium arsenate in concentrations of 0.01 M and 0.05 M, respectively. Alternatively, various other buffers, such as, tris(hydroxymethyl)aminomethane, may be used.

Firefly lantern extract may also be obtained in the laboratory from desiccated firefly tails. The firefly tails are first ground to a fine powder with a mortar and pestle with a small amount of washed silica. The powder is then extracted with 0.05 M $AsO_4^{-3}$—0.01 M $MgSO_4$ at pH 7.4.

The reaction mixture incorporating individual constituents is a controlled mixture of luciferin, purified luciferase and a $Mg^{++}$ salt. This mixture may be prepared by dissolving luciferin, purified luciferase and $MgSO_4$ in a sterile aqueous solution. Aresenate and/or other buffers may be added to provide a pH 7.4.

In order to observe and record small amounts of light produced by a positive response between the material to be assayed and the reaction mixture and to make quantitative measurements of the light emitted, instruments which will sense and record the intensity of the emitted light may be used. One procedure consists of injecting the aqueous ATP extract prepared in accordance with the practice of this invention into a cuvette containing the reaction mixture. (Alternatively, the reaction mixture may be injected into a cuvette containing the extract.) The extract is held at pH 7.4 with potassium arsenate buffer. The light emitted as the result of the reaction between any ATP in the aqueous extract and the reaction mixture strikes the photosensitive surface of a photomultiplier tube giving rise to an electric signal which can be measured and recorded by either an oscilloscope photograph or a chart recorder.

Because the response (i.e., light emission) is almost instantaneous, the reaction mixture should be positioned in front of the light detector prior to the introduction of the extract. Also, the reaction mixture and the extract should be mixed as rapidly as possible. The bioluminescent response with ATP is determined by measuring the maximum intensity of the emitted light, which after reaching this maximum value, decays logarithmically. With all other factors constant, the maximum intensity is directly proportional to the concentration of ATP.

Instrumentation useful for the quantitative measurement of bioluminescence may consist of a photomultiplier tube for the conversion of light energy into an electrical signal, a device for determining the magnitude of the signal, and a light-tight chamber for presentation of the bioluminescent reaction to photomultiplier tube.

In one system, part of the assembly consists of a composite sensing and reaction chamber which contains a photomultiplier tube, with appropriate circuitry, and a rotary cylinder mounted in a block of aluminum in a manner which permits removal of the reaction chamber without exposing the phototube to light. A section of the cylinder wall is cut out to accommodate a cuvette in a suitable reflector. Immediately above the cuvette holder is a small injection port sealed with a replaceable light-tight rubber plug. The entire unit is painted black to reduce light reflection. The photomultiplier converts the light energy into an electrical signal. An oscilloscope, which records the magnitude of the signal from the photomultiplier, is provided with an adjustable vertical deflection scale which will allow an adjustment in system sensitivity. There is a multiple switching arrangement at the oscilloscope input which makes it convenient to adjust the system zeros and balances. the differential input to the oscilloscope provides a means to balance the dark current output of the phototube. The response to the firefly luminescent system displayed on the oscilloscope screen is recorded with a camera which mounts directly onto the front of the oscilloscope. To observe and record the reaction, the cuvette containing the necessary reagents is positioned in the cuvette holder without exposing the phototube. Rotation of the holder positions the cuvette in front of the phototube. The extract, presumed to contain ATP, is then added through the injection port and the magnitude of the response, if any, is recorded by the camera.

In order to make quantitative determinations of the amount of ATP present, the instrument used to measure the light response may be calibrated using known concentrations of ATP. A calibration may be plotted by injecting 1/1,000 ml. portions of known concentrations of ATP through the lightproof seal into the cuvette by means of a hypodermic syringe. The light response is plotted against the ATP concentration. A linear function is obtained.

For experimental purposes thirteen species of bacteria, likely to be encountered in contaminated environments, were cultured and samples taken for analysis by the present method. The following procedure was used for each bacterial culture:

1. A 2 ml. aliquot of each sample was filtered through a microporous bacterial membrane;
2. The bacterial cells retained on the membrane were washed with 2 ml. of sterile cold 0.02 M $AsO_4^{13}$ buffer;
3. The washed bacterial cells were extracted with a cold mixture of 1 ml. of 0.02 M $AsO_4^{13}$ buffer /5 ml. n-butanol;
4. The volume of the aqueous phase was recorded;
5. A 0.01 ml. sample of the aqueous phase was injected into a reaction chamber containing a reaction mixture;
6. The total intracellular ATP was calculated from the response of light emitted by the reaction;
7. The total number of cells in another aliquot of the same culture was determined by plate counting, correcting for cell clumping, and
8. The total ATP per sample, in micrograms, was divided by the total number of cells per the same size sample to obtain the ATP/cell for the bacterial culture.

The reaction mixture was prepared by combining 20 mg. luciferase dissolved in 2 ml. cold sterile water and 1.2 mg. luciferin dissolved in 2 ml. cold 0.02 M $AsO_4^{13}$ buffer (pH 7.4), and adding 2 ml. of 0.01 M $MgSO_4$.

The resultant data showed that a very high correlation existed between the level of ATP in a sample and the number of bacterial cells of the species present. Totally unexpected was the important discovery that intracellular ATP content remained relatively constant regardless of species or growth phase.

A computer print out of this data is found in the drawing. Each number on the printout indicates the number of data points occupying that position. By subsequent claculation it was found that the statistical correlation between log ATP and log bacterial cells was 0.924. Over the thirteen species a mean value of about $5 \times 10^{110}$ μg. ATP/cell was observed. Each of the species is listed below with its corresponding calculated value of intracellular ATP. (Note that each ATP value is within a ±2 fold variation of the mean.)

| Bacterial Species | μg ATP$\times 10^{110}$ per cell |
|---|---|
| Lactobacillus caseii | 3.1 |
| Pseudomonas fluorescens | 3.9 |
| Staphylococcus albus | 3.1 |
| Sarcina subflava | 10.3 |
| Sarcina lutea | 2.2 |
| Bacillus cereus | 6.4 |
| Bacillus subtilis | 9.9 |
| Alkaligenes viscolactea | 3.0 |
| Escherichia coli | 4.1 |
| Aerobacter aerogenes | 2.4 |
| Micrococcus flavus | 4.5 |
| Proteus vulgaris | 3.0 |
| Streptococcus Faecalis | 4.9 |

To test the applicability of this method to bacteria, other than those existing in pure cultures, comparisons were made between the present method and the classical agar plate count method. By way of illustration a representative protocol for a bacteriuria assay will be given:

1. A 10 ml. aliquot of a cold urine sample was centrifuged at 225xg (1,000 r.p.m. at 5¼ inches radius) for 5 minutes;
2. 2 ml. of the supernatant was filtered through a microporous bacterial membrane;
3. The bacterial cells retained on the membrane were washed with 2 ml. of sterile cold saline;
4. The washed bacterial cells were extracted with a cold mixture of 1 ml. 0.02 M $AsO_4^{13}$ buffer/5 ml. n-butanol;
5. The volume of the aqueous phase was recorded;
6. A 0.01 ml. sample of the aqueous phase was injected into a reaction chamber containing the reaction mixture (prepared as in the previous example);
7. The total ATP extracted was calculated from the response of light emitted by the reaction; and
8. The number of bacterial cells was calculated using the formula $X = Y/5 \times 10^{116\ 10}$, where X is the number of bacterial cells and Y is the quantity of ATP extracted, measured in micrograms.

The following table is a statistical comparison of bacterial counts obtained for various environments by this type of protocol and that obtained by the classical agar plate count.

| Material | n | Correlation ratio | Standard dev. σ | 1σ, 68% confidence | 2σ, 95% confidence |
|---|---|---|---|---|---|
| Urine | 98 | 1.110 | 0.069 | 1.04–1.18 | 0.97–1.25 |
| Ludox | 4 | 0.923 | 0.198 | 0.72–1.12 | 0.52, 1.32 |
| Water | 12 | 0.987 | 0.072 | 0.92–1.06 | 0.85–1.13 |
| Food | 13 | 1.037 | 0.142 | 0.99–1.18 | .77–1.30 |

| | | | | |
|---|---|---|---|---|
| Milk | 20 | 1.248 | 0.054 | 1.20–1.30 | 1.15–1.35 |
| Fuel | 12 | 0.949 | 0.13 | .82–1.08 | .69–1.21 |
| Pure cultures | | 1.009 | .068 | .94–1.08 | .87–1.14 |

Correlation ratio = ratio of instrumental ATP bacteria count to agar plate count for bacterial samples.

$n$ = number of tests performed to determine the correlation ratio.

Ludox is a registered trademark for colloidal silica.

The bacterial counts obtained by utilizing the present invention were found to be more valid than those obtained by the traditional plating method. An advantage of the ATP counts, in addition to ease and speed of measurement, was the freedom from errors due to clumping of the bacterial cells or motility of some species; both of which can strongly influence plate counts. The instrumental counts obtained by the process of this invention were shown to be true counts of individual bacteria and could detect as few as 1,000 organisms in less than 5 minutes.

It will be understood that various changes in the details, materials, steps, order of steps, etc., which have been herein described and illustrated in order to explain the nature of the invention, may be made by those skilled in the art within the principle and scope of the invention as expressed in the appended claims.

I claim:

1. A method for determining the population density of bacterial cells in a measured sample of an aqueous suspension, said sample being substantially devoid of interfering nonbacterial cells, said bacterial cells being in an unknown growth phase or of unknown species comprising
   a. removing substantially all extracellular water-soluble material from said measured sample of said suspension whereby substantially all bacterial cells are isolated from said suspension,
   b. extracting adenosine triphosphate from said isolated bacterial cells,
   c. measuring the quantity of adenosine triphosphate extracted, and
   d. determining the population density of bacterial cells from a single predetermined substantially constant relationship of quantity of adenosine triphosphate to number of bacterial cells.

2. The method of claim 1 wherein said relationship of quantity of adenosine triphosphate to number of bacterial cells is a constant ratio.

3. The method of claim 2 wherein said constant ratio has the value of $5 \times 10^{110}$ microgram adenosine triphosphate per bacterial cell.

4. The method of claim 2 wherein substantially all of said bacterial cells are isolated from said suspension by passing said suspension through a bacterial membrane filter.

5. The method of claim 2 wherein the quantity of said adenosine triphosphate extracted is measured by reacting said adenosine triphosphate with a mixture comprising luciferin and luciferase in the presence of a metal cation and oxygen and measuring the light emitted.

6. The method of claim 5 wherein said cation is magnesium ion.

7. A method for the determination of the quantity of bacterial cells present in a sample of an aqueous suspension said sample being substantially devoid of interfering nonbacterial cells, said cells being in an unknown growth phase or of unknown species comprising
   a. separating substantially all bacterial cells from said sample,
   b. extracting adenosine triphosphate from said separated bacterial cells,
   c. measuring the quantity of adenosine triphosphate extracted and
   d. determining the number of bacterial cells in said sample, from the formula $X = Y \, 5 \times 10^{110}$, where X is the number of said bacterial cells and Y is the quantity of said adenosine triphosphate extracted, measured in micrograms.

8. The method of claim 7 wherein the quantity of said adenosine triphosphate extracted is measured by reacting said adenosine triphosphate with a mixture comprising luciferin and luciferase in the presence of a metal cation and oxygen and measuring the light emitted.

9. The method of claim 8 wherein said cation is magnesium ion.

* * * * *

PO-1050
(5/69)

UNITED STATES PATENT OFFICE
CERTIFICATE OF CORRECTION

Patent No. 3,616,253      Dated October 26, 1971

Inventor(s) Anthony J. D'Eustachio

It is certified that error appears in the above-identified patent and that said Letters Patent are hereby corrected as shown below:

Abstract, line 13, change "$5x10^{110}$" to -- $5x10^{-10}$ --.

Column 1, line 39, change "an" to --on--.

Column 2, line 64, change "$AsO_4^{13}$" to -- $AsO_4^{-3}$, or other, buffer --.

Column 3, line 28, before "photomultiplier" insert --the--.

Column 3, line 72, change "$AsO_4^{13}$" to -- $AsO_4^{-3}$ --.

Column 3, line 74, change "$AsO_4^{13}$" to -- $AsO_4^{-3}$ --.

Column 4, line 13, change "$AsO_4^{13}$" to -- $AsO_4^{-3}$ --.

Column 4, line 26, change "$5x10^{110}$" to -- $5x10^{-10}$ --.

Column 4, line 30, change "$ATPx10^{110}$" to --$ATPx10^{-10}$--.

Column 4, line 55, change "$AsO_4^{13}$" to -- $AsO_4^{-3}$ --.

Column 4, line 63, change "$y/5x10^{116}\ 10$" to --$Y/5x10^{-10}$--.

Claim 3, line 2, change "$5x10^{110}$" to -- $5x10^{-10}$ --.

Claim 7, line 13, change "$Y\ 5x10^{110}$" to -- $Y/5x10^{-10}$ --.

Signed and sealed this 13th day of June 1972.

(SEAL)
Attest:

EDWARD M. FLETCHER, JR.
Attesting Officer

ROBERT GOTTSCHALK
Commissioner of Patents